United States Patent
Imle

(10) Patent No.: US 10,464,082 B2
(45) Date of Patent: Nov. 5, 2019

(54) COATING SYSTEM AND CORRESPONDING OPERATING METHOD

(71) Applicant: Dürr Systems AG, Bietigheim-Bissingen (DE)

(72) Inventor: Matthias Imle, Pleidelsheim (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 0 days.

(21) Appl. No.: 15/742,618

(22) PCT Filed: Jul. 1, 2016

(86) PCT No.: PCT/EP2016/001129
§ 371 (c)(1),
(2) Date: Jan. 8, 2018

(87) PCT Pub. No.: WO2017/008888
PCT Pub. Date: Jan. 19, 2017

(65) Prior Publication Data
US 2018/0200739 A1 Jul. 19, 2018

(30) Foreign Application Priority Data
Jul. 15, 2015 (DE) .................. 10 2015 009 214

(51) Int. Cl.
*B05B 3/00* (2006.01)
*B05B 13/04* (2006.01)
(Continued)

(52) U.S. Cl.
CPC ............ *B05B 3/001* (2013.01); *B05B 3/1035* (2013.01); *B05B 13/0431* (2013.01);
(Continued)

(58) Field of Classification Search
USPC ............................. 118/323, 321, 58
See application file for complete search history.

(56) References Cited

U.S. PATENT DOCUMENTS 6,972,052 B2   12/2005   Krumma et al.
8,807,077 B2   8/2014    Meissner et al.
(Continued)

FOREIGN PATENT DOCUMENTS

CN   101086431 A    12/2007
DE   39 07 437 A1   7/1989
(Continued)

OTHER PUBLICATIONS

International Search Report and Written Opinion for PCT/EP2016/001129 dated Oct. 12, 2016 (15 pages; with English translation).
State Intellectual Property Office of the People's Republic of China Search Report for Patent Application No. 201680039693.2 dated Mar. 29, 2019 (2 pages; English translation only).

* cited by examiner

*Primary Examiner* — Yewebdar T Tadesse
(74) *Attorney, Agent, or Firm* — Bejin Bieneman PLC

(57) ABSTRACT

The disclosure relates to a coating system for coating components with a coating agent, in particular a painting system for painting motor vehicle bodywork components, comprising a first coating system component (12, 13) which during operation produces waste heat as a by-product and forms a heat source, and a second coating system component (1, 5) which is heated during operation and forms a heat sink. The disclosure provides that the waste heat of the first coating system component (12, 13) is fed to the second coating system component (1, 5) for heating. The disclosure further relates to a corresponding operating method.

24 Claims, 2 Drawing Sheets

(51) Int. Cl.
*B05B 3/10* (2006.01)
*B25J 19/00* (2006.01)
*B25J 9/12* (2006.01)
*B25J 11/00* (2006.01)
*F24H 9/18* (2006.01)

(52) U.S. Cl.
CPC ............ *B05B 13/0452* (2013.01); *B25J 9/12* (2013.01); *B25J 11/0075* (2013.01); *B25J 19/0054* (2013.01); *F24H 9/1854* (2013.01); *Y10S 901/23* (2013.01); *Y10S 901/43* (2013.01)

(56) References Cited

U.S. PATENT DOCUMENTS

| | | |
|---|---|---|
| 2006/0261192 A1 | 11/2006 | Haas et al. |
| 2007/0176019 A1 | 8/2007 | Lind et al. |
| 2012/0240847 A1* | 9/2012 | Neufelder ................. F16D 3/02 118/323 |

FOREIGN PATENT DOCUMENTS

| | | |
|---|---|---|
| DE | 195 36 626 A1 | 3/1997 |
| DE | 10 2007 030724 A1 | 1/2009 |
| DE | 10 2013 006 334 A1 | 10/2014 |
| EP | 1 393 816 A1 | 3/2004 |

US 10,464,082 B2

COATING SYSTEM AND CORRESPONDING OPERATING METHOD

CROSS-REFERENCE TO RELATED APPLICATIONS

This application is a national stage of, and claims priority to, Patent Cooperation Treaty Application No. PCT/EP2016/001129, filed on Jul. 1, 2016, which application claims priority to German Application No. DE 10 2015 009 214.6, filed on Jul. 15, 2015, which applications are hereby incorporated herein by reference in their entireties.

BACKGROUND

The disclosure relates to a coating system for coating components, in particular in the form of a painting system for painting motor vehicle bodywork components. The disclosure further relates to a corresponding operating method for such a coating system.

In modern painting systems for painting motor vehicle bodywork components, rotary atomizers which emit a spray jet of the paint to be applied by means of a rotating bell cup, which is per se known from the prior art, are typically used as the application device. The mechanical drive of the rotating bell cup typically takes place by means of a compressed air turbine which is arranged in the rotary atomizer and powered by compressed air.

It is herein problematic that the compressed air expands in the compressed air turbine and thereby cools, which can lead to a disruptive condensation water formation in the compressed air turbine.

In order to solve this problem, it is known from the prior art to heat the compressed air before feeding it to the compressed air turbine, for example, by means of an electrical heater. A disadvantage of this solution, however, is the additional investment costs for the electrical heater and the operating costs for the operation of the electrical heater, since for this, electrical energy must be provided.

From DE 10 2013 006 334 A1, a painting system is known in which the cold arising as a by-product of the operation of pneumatic pumps is used to cool a heat-sensitive coating system component (e.g. "rail house"). This document thus discloses merely a cooling device and a corresponding cooling method.

Furthermore, reference is made with regard to the prior art, to DE 39 07 437 A1, DE 195 36 626 A1 and US 2006/0261192 A1.

DETAILED DESCRIPTION

Figure 1:
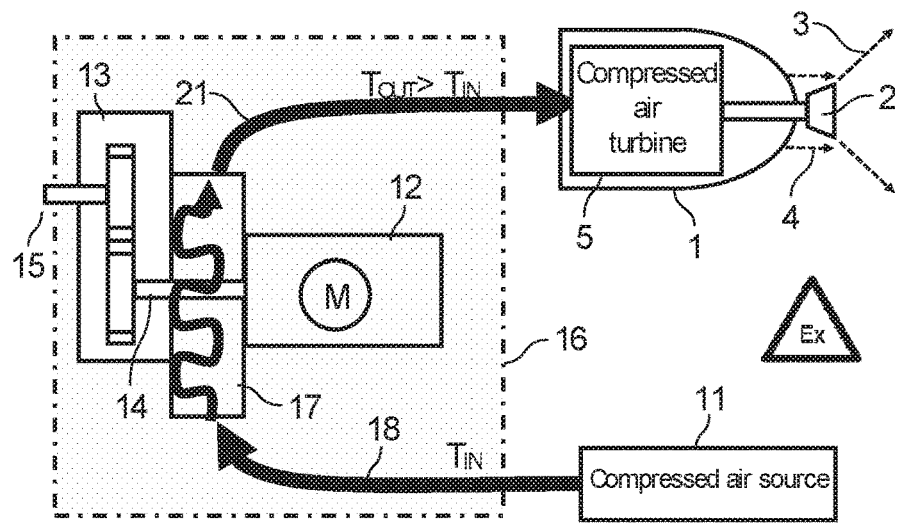
FIG. 1 shows a schematic representation of a painting system according to the invention, in which the waste heat of a robot drive is used for heating the compressed air for the rotary atomizer.

The disclosure includes the general technical teaching of using the waste heat from robot drives for heating process media (e.g. compressed air) of a rotary atomizer. In this way, two problems can be solved in the context of the disclosure. Firstly, the robot drives are thereby cooled since the waste heat of the robot drives is conducted away. Secondly, through the use of the waste heat of the robot drives, an electrical heater to heat the process media can be dispensed with, so that the investment costs and the operating costs of the coating system can be reduced.

The disclosed coating system thus has, firstly, a first coating system component which produces waste heat as a by-product during operation and therefore forms a heat source. This first coating system component can be, for example, a robot drive which produces waste heat, as previously mentioned by way of example.

However, the disclosure is not restricted to robot drives with regard to the first waste heat-generating coating system components. Rather, the first waste heat-generating coating system component in the context of the disclosure can also be another component which produces, as a by-product, waste heat that can be used in the context of the disclosure. Purely by way of example, drives for conveying systems or drives of a travel axis of the painting robot should be mentioned.

The concept of a first waste heat-producing coating system component as used in the context of the disclosure is to be distinguished from the aforementioned conventional heater for heating the drive air of the rotary atomizer which, although it produces heat, fulfils no further functions in the coating system. The expression of the waste heat-producing first coating system components is thus directed to components, assemblies or elements of the coating system which, in addition to their heating function, perform another function (e.g. driving a painting robot) in the coating system and generate the waste heat purely as a by-product.

Furthermore, the disclosed coating system comprises a second coating system component which must be heated during operation and thus forms a heat sink. In an example, this second coating system component is a compressed air turbine, the feed air of which is heated in order to prevent condensation water formation in the compressed air turbine.

However, the disclosure is not restricted to a compressed air turbine with regard to the second coating system component that is to be heated. For example, the possibility also exists that shaping air which is emitted by the rotary atomizer in order to shape the spray jet is heated, wherein shaping air jets are per se known from the prior art and therefore need not be further described.

The disclosure is distinguished in that the conventionally unused waste heat of the first coating system component (e.g. robot drive) is fed to the second coating system component (e.g. compressed air turbine or feed air to the compressed air turbine) in order to heat it.

In the example, a heat exchanger is provided which absorbs the waste heat from the first coating system component (e.g. robot drive) and feeds it to the second coating system component (e.g. drive air for the compressed air turbine).

In one example, the heat exchanger is connected on its warm side to the waste heat-generating first coating system component (e.g. robot drive) and transfers the absorbed waste heat on its cold side to a gaseous or liquid substance stream (e.g. compressed air stream). The heat transfer from the waste heat-generating first coating system component (e.g. rotary atomizer) to the heat exchanger therefore preferably takes place primarily or exclusively by heat conduction. The heat transfer from the heat exchanger to the substance stream (e.g. drive air) at the cold side of the heat exchanger, however, may take place by heat conduction and convection.

It should further be mentioned that the second coating system component (e.g. rotary atomizer) to be heated preferably operates with a liquid or gaseous process medium (e.g. compressed air). For example, conventional rotary atomizers use compressed air as drive air for driving the compressed air turbine, as shaping air for shaping the spray jet and as bearing air for supporting the bell cup shaft in the compressed air turbine. The waste heat from the first coating system component (e.g. robot drive) can be used in order to heat the process medium (e.g. drive air, shaping air) of the second coating system component (e.g. rotary atomizer). For this, the process medium to be heated is preferably first fed to the heat exchanger and then, in the heated stated, to the second coating system component (e.g. rotary atomizer).

It was briefly mentioned above that the waste heat-producing first coating system component can be, for example, a robot drive which mechanically drives a robot (e.g. painting robot, manipulating robot) of the coating system. Such robot drives typically have an electric motor and a gearbox which during operation both generate waste heat, which can be used.

In the example, arranged between the motor and the gearbox is a cooling flange which conducts the waste heat away from the motor and/or the gearbox and thereby cools the robot drive. The cooling flange is herein thermally connected to the motor and/or the gearbox and conducts the waste heat away from the motor and/or the gearbox, in particular via the heat exchanger which can be integrated into the cooling flange. It may be herein advantageous if the cooling flange is connected on one side to the gearbox and on the other side to the motor, since in this way, a good thermal contact to the motor and the gearbox is achieved.

In the example, the cooling flange has two housing parts which, in the mounted state, lie on one another and sealingly enclose a housing interior. The two housing parts then may each have a cylindrical bore through which the output shaft of the motor or the input shaft of the gearbox can be fed, wherein the bores are sealed in relation to the housing interior. The cooling flange may have an inlet and an outlet wherein the process medium (e.g. compressed air) to be heated is conducted through the inlet into the housing interior and is conducted out of the housing interior again through the outlet.

During operation, this cooling flange heats up due to heat transfer from the gearbox and the motor, wherein the heat dissipates from the inner wall of the cooling flange to the process medium (e.g. compressed air) in the housing interior. It is therefore desirable to enable the best possible heat transfer from the inner wall of the cooling flange to the process medium (e.g. compressed air) in the housing interior. For this purpose, the cooling flange may have at least one rib internally, which protrudes into the housing interior and thereby enlarges the contact area between, firstly, the cooling flange and, secondly, the process medium, which facilitates the heat transfer. In the example, the cooling flange has numerous ribs in the housing interior in order to improve the heat transfer.

Furthermore, the ribs and the inlet and the outlet are preferably arranged such that the process medium forms an annular flow between the inlet and the outlet of the cooling flange, extending round the bore for the input shaft and/or the output shaft. It is thereby achieved that the process medium remains a relatively long time in the housing interior, which also contributes to good heating of the process medium (e.g. compressed air) in the cooling flange.

It has been briefly mentioned above that the disclosed coating system can comprise at least one robot (e.g. painting robot, manipulating robot) wherein the waste heat of the associated robot drive can be utilized to heat the second coating system component (e.g. compressed air for compressed air turbine). Such a robot may comprise a robot base that is fixed or is displaceable along a travel axis, a rotatable robot element, a pivotable proximal robot arm (known in the specialist jargon as "arm 1"), a pivotable distal robot arm (known as "arm 2") and a multi-axis robot hand axis which is per se known from the prior art. The robot drive with a motor and gearbox supplying waste heat can herein be mounted, for example, in the robot base or in the rotatable robot element.

It has been mentioned in the introduction regarding the prior art that the robot drive of a painting robot can be encapsulated in an encapsulation, which can be required for explosion-proof reasons since in the paint booth, an explosive atmosphere can arise. The encapsulation of the robot drive can thus be configured as a pressure-proof encapsulation, as an overpressure-proof encapsulation or as an oil encapsulation in accordance with DIN ISO 60079. In the context of the invention, it should be mentioned in this regard that the process medium (e.g. compressed air) to be heated is fed into the encapsulation, then heated within the encapsulation and finally is conducted out of the encapsulation again. It is herein advantageous if the feeding of the process medium into the encapsulation and the conduction of the process medium out of the encapsulation does not impair the explosion protection of the encapsulation and also meets the legal requirements for an explosion protection, in particular, the requirements according to DIN EN ISO 60079.

It has already been mentioned briefly that the utilization of the waste heat of the robot drive for heating the compressed air makes an additional heater unnecessary, so that the investment and operating costs of the coating system can be reduced. However, in the context of the invention, it is also possible that an electrical heater is also used which can be employed, for example, if the robot drive does not yet supply enough waste heat at the start of operation.

Finally, it should also be mentioned that the disclosure also relates to a corresponding operating method, as already mentioned in the above description, so that a separate description of the operating method can be dispensed with.

Other advantageous developments of the disclosure are disclosed in the subclaims or are described below in greater detail together with the description of the preferred exemplary embodiment of the invention, making reference to the drawings. In the drawings:

The painting system shown includes a rotary atomizer 1 which, by means of a rotating bell cup 2, emits a spray jet 3 of the paint to be applied, as is per se known from the prior art.

In order to form the spray jet 3, the rotary atomizer can emit a shaping air jet 4 from behind onto the spray jet 3, which is also per se known from the prior art.

The drive of the rotating bell cup 2 takes place in a conventional manner with a compressed air turbine 5 in the rotary atomizer 1.

Figure 2:
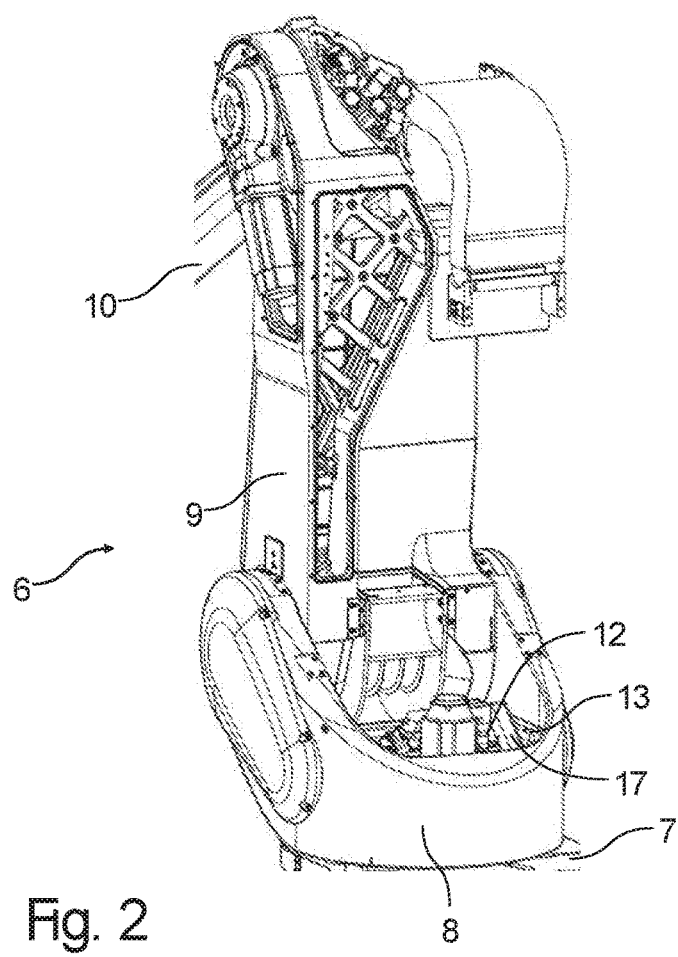
FIG. 2 shows a perspective view of an disclosed painting robot with a heat exchanger in the rotatable robot element.

The rotary atomizer 1 is guided in a conventional manner by a multi-axis painting robot 6 which is shown in FIG. 2. The painting robot 6 comprises a robot base 7 which is fixed or is movable along a travel axis, a rotatable robot element 8, a proximal robot arm 9 and a distal robot arm 10, wherein such a construction is per se known from the prior art and will therefore not be described in detail.

It should be mentioned here that the painting robot 6 is arranged with the rotary atomizer 1 in a paint booth, so that the interior of the paint booth forms an explosion-endangered area, as shown in FIG. 1 by the usual warning symbol.

The drive of the compressed air turbine 5 in the rotary atomizer 1 takes place with a compressed air source 11 which provides the necessary compressed air.

It is also shown in FIG. 1 that the mechanical drive of the painting robot 6 takes place by means of a robot drive which comprises an electric motor 12 and a gearbox 13. The electric motor 12 herein comprises an output shaft 14 which is connected to the gearbox 13, wherein the gearbox 13 itself comprises an output shaft 15.

It should herein be mentioned that the electric motor 12 fundamentally brings with it the danger that the explosive atmosphere in the paint booth could be ignited by sparks. The entire robot drive with the electric motor 12 and the gearbox 13 is therefore arranged in an explosion-proof encapsulation 16, wherein the explosion protection encapsulation 16 meets the standards according to DIN ISO 60079.

Herein, arranged between the electric motor 12 and the gearbox 13 is a cooling flange 17 which has the task of conducting away the intrinsically troublesome waste heat from the electric motor 12 and the gearbox 13 in order to prevent excessive heating of the robot drive. For this purpose, the compressed air source 11 is connected via a compressed air line 18 to an inlet 19 of the cooling flange 17. The compressed air from the compressed air source 11 is thus initially conducted through the compressed air line 18 into the cooling flange 17 wherein the compressed air fed in has a temperature $T_{IN}$. The compressed air fed through is then heated in the cooling flange 17 by the waste heat of the electric motor 12 and the gearbox 13 and leaves the cooling flange 17 again via an outlet 20. The heated compressed air is then fed via a compressed air line 21 to the rotary atomizer 1 wherein in the compressed air line 21, the heated compressed air has a temperature $T_{OUT} > T_{IN}$.

It should herein be mentioned that the cooling flange 17 is arranged between the electric motor 12 and the gearbox 13 and is therefore heated both by the gearbox 13 and by the electric motor 12. The arrangement of the cooling flange 17 between the electric motor 12 and the gearbox 13 advantageously also leads to a good heat transfer between the cooling flange 17 on one side and the electric motor 12 and/or the gearbox 13 on the other.

Figure 3:
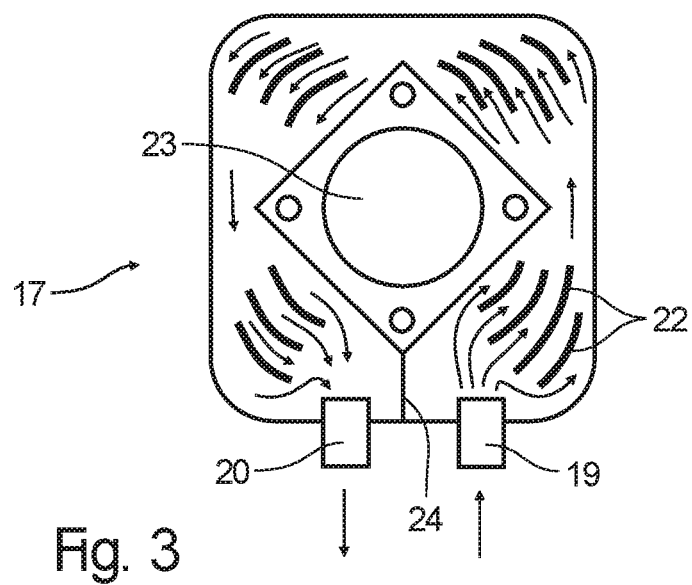
FIG. 3 shows a simplified representation of a housing part of the cooling flange between the electric motor and the gearbox of FIG. 1.

Furthermore, FIG. 3 shows that in the cooling flange 17, numerous ribs 22 are provided which protrude from the inner wall of the cooling flange 17 into the housing interior.

Firstly, the ribs 22 lead to an enlargement of the contact area between the inner wall of the cooling flange 17 on one side and the compressed air to be heated and situated in the housing interior, on the other side, which contributes to a good heat transfer.

Secondly, the ribs 22 in the housing interior of the cooling flange 17 also force an annular flow which is oriented anticlockwise in the drawing according to FIG. 3 and leads from the inlet 19 round a bore 23 to the outlet 20. This annular flow in the housing interior of the cooling flange 17 ensures that the compressed air remains for a sufficiently long time in the cooling flange 17 and is therefore sufficiently strongly heated.

Regarding the bore 23 in the cooling flange 17, it should be mentioned that it serves for the passage of the output shaft 14 of the electric motor 12, wherein the bore 23 is sealed in relation to the housing interior of the cooling flange 17.

Thus, heated compressed air is fed to the rotary atomizer 1 and can be used for driving the compressed air turbine 5 or for the output of the shaping air jet 4. The heating of the compressed air fed in herein advantageously hinders a disruptive condensation water formation in the rotary atomizer 1.

Furthermore, FIG. 3 shows an optional partition wall 24 between the inlet 19 and the outlet 20, wherein the partition wall 24 determines the flow direction between the inlet 19 and the outlet 20. It should herein be noted that the partition wall 24 is optional, i.e. the partition wall 24 is not necessarily required for the functioning of the invention.

Finally, from FIG. 2, it is apparent that the electric motor 12, the gearbox 13 and the cooling flange 17 are mounted in the rotatable robot element 8.

The disclosure is not restricted to the above-described preferred exemplary embodiment. Rather a plurality of variants and derivations is possible which also make use of the disclosed concepts and therefore fall within the protective scope.

The invention claimed is:

1. Coating system for coating components with a coating agent, comprising:
   a) a first coating system component which produces waste heat as a by-product during operation and therefore forms a heat source, the first coating system component is part of a robot drive, the robot drive including at least one of a motor and a gear box, and
   b) a second coating system component which is heated during operation and forms a heat sink,
   c) wherein the waste heat of the first coating system component is fed to the second coating system component for heating.

2. Coating system according to claim 1, wherein a heat exchanger is provided, which absorbs the waste heat of the first coating system component and feeds it to the second coating system component.

3. Coating system according to claim 2, wherein the heat exchanger is connected on its warm side to the waste heat-generating first coating system component and transfers the absorbed waste heat on its cold side to a gaseous or liquid substance stream.

4. Coating system according to claim 1, wherein
   a) the second coating system component to be heated operates with a process medium, and
   b) the waste heat of the first coating system component heats the process medium of the second coating system component,
   c) the process medium initially flows through the heat exchanger and is then fed to the second coating system component.

5. Coating system according to claim 1, wherein the first coating system component supplying waste heat is a mechanical component of the coating system.

6. Coating system according to claim 1, wherein at least one of the first coating system component supplying waste heat, the second coating system component and the heat exchanger are encapsulated in an encapsulation.

7. Coating system according to claim 6, wherein the encapsulation is an explosion-protection encapsulation.

8. Coating system according to claim 7, wherein the encapsulation is selected from a group consisting of:
   a pressure-proof encapsulation,
   an overpressure-proof encapsulation, and
   an oil encapsulation.

9. Coating system according to claim 6, wherein the process medium to be heated is fed into the encapsulation, then heated within the encapsulation and finally is conducted out of the encapsulation again.

10. Coating system according to claim 9, wherein the feeding of the process medium into the encapsulation and the conduction of the process medium out of the encapsulation meets the requirements for an explosion protection encapsulation.

11. Coating system for coating components with a coating agent, comprising:
    a) a first coating system component which produces waste heat as a by-product during operation and therefore forms a heat source, the first coating system component is part of a robot drive, the robot drive including a motor and a gearbox having an input side and an output side, the gearbox being driven on the input side by the motor and the output side of the gearbox mechanically driving the robot, the first coating system component further including a cooling flange for conducting away the waste heat from at least one of the motor and the gearbox, wherein the cooling flange is arranged between the motor and the gearbox, is thermally connected to at least one of the motor and the gearbox, and the waste heat is conducted away from at least one of the motor and the gearbox by means of the heat exchanger, and
    b) a second coating system component which is heated during operation and forms a heat sink,
    c) wherein the waste heat of the first coating system component is fed to the second coating system component for heating.

12. Coating system according to claim 11, wherein the cooling flange comprises two housing parts which, in the mounted state, lie against one another and sealingly enclose a housing interior or in that the cooling flange is in one piece.

13. Coating system according to claim 12, wherein the two housing parts each have a cylindrical bore for the passage of a shaft of the motor or of the gearbox wherein, in the mounted state, the two bores are oriented coaxially and are sealed in relation to the housing interior.

14. Coating system according to claim 13, wherein the cooling flange comprises an inlet in order to conduct the process medium to be heated into the housing interior.

15. Coating system according to claim 14, wherein the cooling flange comprises an outlet in order to conduct the heated process medium out of the housing interior.

16. Coating system according to claim 15, wherein the cooling flange comprises at least one rib internally which protrudes into the housing interior in order to improve the thermal contact between the cooling flange, on one side, and the process medium in the housing interior, on the other side.

17. Coating system according to claim 16, wherein the process medium is conducted between the inlet and the outlet by the ribs round the bores, so that an annular stream of the process medium forms round the bores.

18. Coating system according to claim 17, wherein the cooling flange comprises a partition wall which is arranged between the inlet and the outlet.

19. Coating system for coating components with a coating agent, comprising:
    a) at least one robot with a robot base, a rotatable robot element, a proximal robot arm and a distal robot arm;
    b) a first coating system component which produces waste heat as a by-product during operation and therefore forms a heat source, the first coating system component including a heat exchanger and the first coating system component being mounted in the robot base or in the rotatable robot element, and
    c) a second coating system component which is heated during operation and forms a heat sink,
    d) wherein the waste heat of the first coating system component is fed to the second coating system component for heating.

20. Coating system for coating components with a coating agent, comprising:
    a) a first coating system component which produces waste heat as a by-product during operation and therefore forms a heat source,
    b) a second coating system component which is heated during operation and forms a heat sink,
    c) a heat exchanger between the first and second coating systems, and the first coating system component, the heat exchanger and the second coating system component are encapsulated in an encapsulation,
    c) wherein the waste heat of the first coating system component is fed to the second coating system component for heating.

21. Coating system according to claim 20, wherein the encapsulation is an explosion-protection encapsulation.

22. Coating system according to claim 21, wherein the encapsulation is selected from a group consisting of:
    a pressure-proof encapsulation,
    an overpressure-proof encapsulation, and
    an oil encapsulation.

23. Coating system according to claim 20, wherein the process medium to be heated is fed into the encapsulation, then heated within the encapsulation and finally is conducted out of the encapsulation again.

24. Coating system according to claim 23, wherein the feeding of the process medium into the encapsulation and the conduction of the process medium out of the encapsulation meets the requirements for an explosion protection encapsulation.

\* \* \* \* \*